United States Patent [19]
Renn et al.
[11] Patent Number: 4,823,162
[45] Date of Patent: Apr. 18, 1989

[54] METHOD AND APPARATUS FOR MARKING PHOTOGRAPHIC ORDERS

[75] Inventors: John O. Renn; Hans U. Schlapfer, both of Seattle; Kenneth G. Hammerquist; Charalambos Caracostantis, both of Bellevue, all of Wash.

[73] Assignee: Ciba-Geigy Corporation, Ardsley, N.Y.

[21] Appl. No.: 50,816

[22] Filed: May 15, 1987

[51] Int. Cl.[4] .................. G03B 27/32; G06F 15/20; B41J 1/20

[52] U.S. Cl. .................. 355/40; 235/375; 355/77; 101/111

[58] Field of Search .................. 354/105, 109; 355/40, 355/77, 112, 132, 133; 83/71, 371; 101/111; 235/375

[56] References Cited

U.S. PATENT DOCUMENTS

| | | | |
|---|---|---|---|
| 2,482,242 | 9/1949 | Brustman | 355/40 X |
| 3,576,369 | 4/1971 | Wick et al. | 355/77 |
| 3,600,089 | 8/1971 | Walter | 355/40 X |
| 3,836,246 | 9/1974 | Bowker | 355/40 X |
| 3,947,109 | 3/1976 | Kinder et al. | 355/112 X |
| 4,088,404 | 5/1978 | Zahn et al. | 355/40 X |
| 4,265,174 | 5/1981 | Jenkins | 101/111 |
| 4,567,356 | 1/1986 | Signoretto | 235/375 |

FOREIGN PATENT DOCUMENTS

| | | |
|---|---|---|
| 225991 | 6/1987 | European Pat. Off. . |
| 2134667 | 8/1984 | United Kingdom . |

*Primary Examiner*—Donald A. Griffin
*Attorney, Agent, or Firm*—Christensen, O'Connor, Johnson & Kindness

[57] ABSTRACT

A system for matching the envelope, film, and prints that make up a photographic processing order includes a method of identifying the film with a particular customer. The method includes the steps of reading a preprinted bar code from the customer envelope, printing that bar code on a segment of a continuous stock of splice tape, and then using that segment of splice tape to join the identified film to other films to form a continuous reel. The bar code from the film can be read after processing and matched to the envelope bearing the same bar code. An additional step includes encoding at least a portion of the identifying code on the prints made from the film in order to provide a three-way match. A splice tape printer to carry out the method includes a print head that is capable of simultaneously printing a bar code number and a human-readable number on the tape segment.

6 Claims, 5 Drawing Sheets

METHOD AND APPARATUS FOR MARKING PHOTOGRAPHIC ORDERS

BACKGROUND OF THE INVENTION

This invention relates to the maintenance of correlation between the parts of a photographic processing order as it travels through the processing laboratory and, more specifically, relates to a method and apparatus for marking each of the elements of the order, namely, the customer envelope, the film, and the prints made from the film to provide an identification that can be checked from time to time to ensure that the order is returned to the correct customer after processing is completed.

In amateur photography most film processing is accomplished in large batch-proccessing labs. The film comes from the customer in an envelope with the customer's name on it. The film is separated from the envelope during processing and after processing the processed film and prints made from the film are reunited with the envelope to provide a completed order that can be returned to the customer. Critical need exists for maintaining a match between the film, prints, and envelope during and after processing to ensure that the film order is returned to the proper customer. In practice, the processing is done in batches with the film and envelopes maintained in physical sequence so that the processed film coming out of the processing steps should be in the same order in which it was introduced into the processing operation. Likewise, the envelopes from which the film was taken should be maintained in the same physical order while awaiting a reuniting with the film so that, if everything goes smoothly, the film and the envelopes can be quickly and easily matched. While the maintenance of the physical sequence goes a great way toward providing a match at the end of processing, unexpected events can occur during processing to change the physical order of the film or the envelopes and it is necessary to have some way of checking and, if necessary, reestablishing the correct sequence. The possibility of unreported or unnoticed human or machine errors occurring during handling of the film, the prints made from the film, or the order envelopes is great enough that the film and envelope must be checked for a match after processing and before return to the customer, at least on a statistical basis, to ensure that the processing is occurring in the correct order and that the right orders are being sent to the customer.

Previous schemes to provide such matching have provided for generating a number to be used as an identifying code and printing that number on the envelope and marking the film with the same number. Early methods included the placement of preprinted numbered tags on both the envelope and the film prior to processing so that those numbers could be read by an operator at the end of procesing to check the match. In present methods, the numbers are sometimes provided in machine-readable form so that the checking can be done automatically by machine, rather than by a human operator, at least in the first instance.

In the batch processing of film, for example, 35 mm film, the individual filmstrips are joined together by splice tape into a continuous reel prior to and during processing. A current method of identification includes using a splice tape having preprinted sequential numbers placed on the splice tape when it is manufactured so that the splice tape can then be used to join successive filmstrips. The same number is then read by a reader and printed on the envelope at the beginning of processing. Both of the above methods have the disadvantage of adding a new number to the operation that has no correlation to anything that existed previously and, more importantly, has no correlation to anything that the customer has knowledge of.

It is therefore an object of the present invention to provide a method and apparatus for checking the correlation between film and envelope and prints of a customer order.

It is a further object of the present invention to provide such an identification system that uses a number for the identification that already exists and is at least related to the information in the possession of the customer.

SUMMARY OF THE INVENTION

In accordance with the above-stated objects, a method of identifying the parts of a customer order to maintain correlation between those parts during film processing includes the step of reading a preexisting number on the customer envelope and printing the same number on a segment of a continuous stock of splice tape. The printed segment of splice tape is then separated from the continuous stock roll and applied to adjacent filmstrips to form a continuous web of film for processing. After processing, the number on the envelope and the number of the filmstrip are read and checked for correlation to determine whether a match exists. If a match does not exist, an alarm indication is given and the operator takes corrective action.

In a preferred embodiment of the invention, the number on the envelope is machine-readable and is in bar code and the number printed on the splice tape is likewise in bar code. Preferably, a human-readable identifying code is simultaneously printed on the splice tape along with the bar code. The human-readable identification code may be related but does not need to be related to the envelope number.

A further feature of the invention includes the step of marking the prints made from the film with an identification code related to the envelope number. After processing the identification code on the prints is read and compared to the identification code on the film and on the envelope. The identification code can be printed on the prints in a machine-readable form, such as by bar code, or can be encoded on the prints in binary form through the use of punch marks placed on opposite sides of the prints.

An apparatus for carrying out the method includes an envelope reader for reading the identification number from the envelope and producing a signal representative of that identification number. A printer means is coupled to the envelope reader and receives the identification code signal and processes the signal and prints the identification code on the segment of splice tape. A cutter is provided that separates the splice tape segment and applies it to the adjacent ends of two filmstrips being moved along the processing path. A second reader is provided for reading the identification number on the splice tape at the end of the processing path and a third reader means is provided for reading the envelope number. The apparatus also includes a comparator for receiving the identification codes from the second and third readers and comparing them and producing an alarm signal, should the codes not match.

In one embodiment of the invention, the printer means includes means for printing a human-readable number simultaneously with the machine-readable code on the splice tape. The human-readable number may be the same as the machine-readable number or it may be a separate sequence number having no relation to the number read from the envelope. The system also includes, in a preferred embodiment, a means for transforming the envelope number into binary form and for marking the envelope number on prints produced from the photographic film. A print notcher is provided that is selectively operable to form a notch on a first or a second edge of the prints in accordance with the binary number to be encoded. A notch on the first edge indicates a "0" and a notch on the second edge indicates a "1". The notch or similar marking can be the same mark that is used to indicate the print edges for separation of individual prints from a roll.

Preferably, the machine-readable code is printed in bar code on the splice tape and is printed across the width of the tape.

BRIEF DESCRIPTION OF THE DRAWINGS

The operation and advantages of the present invention will be better understood by those of ordinary skill in the art and others upon reading the ensuing specification, when taken in conjunction with the appended drawings, wherein.

DETAILED DESCRIPTION OF THE PREFERRED EMBODIMENT

Figure 1:
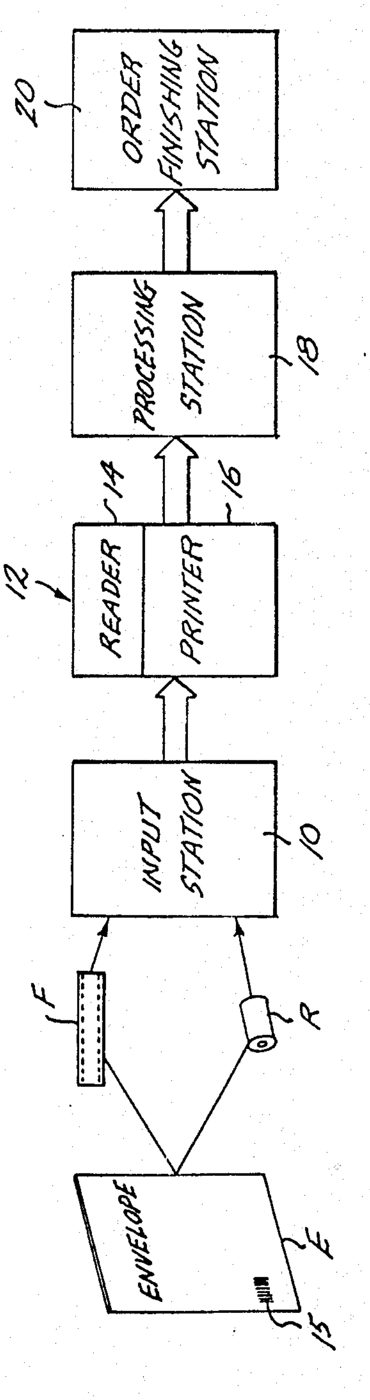
FIG. 1 is a block diagram of an identification system made in accordance with the principles of the present invention.
Figure 2:
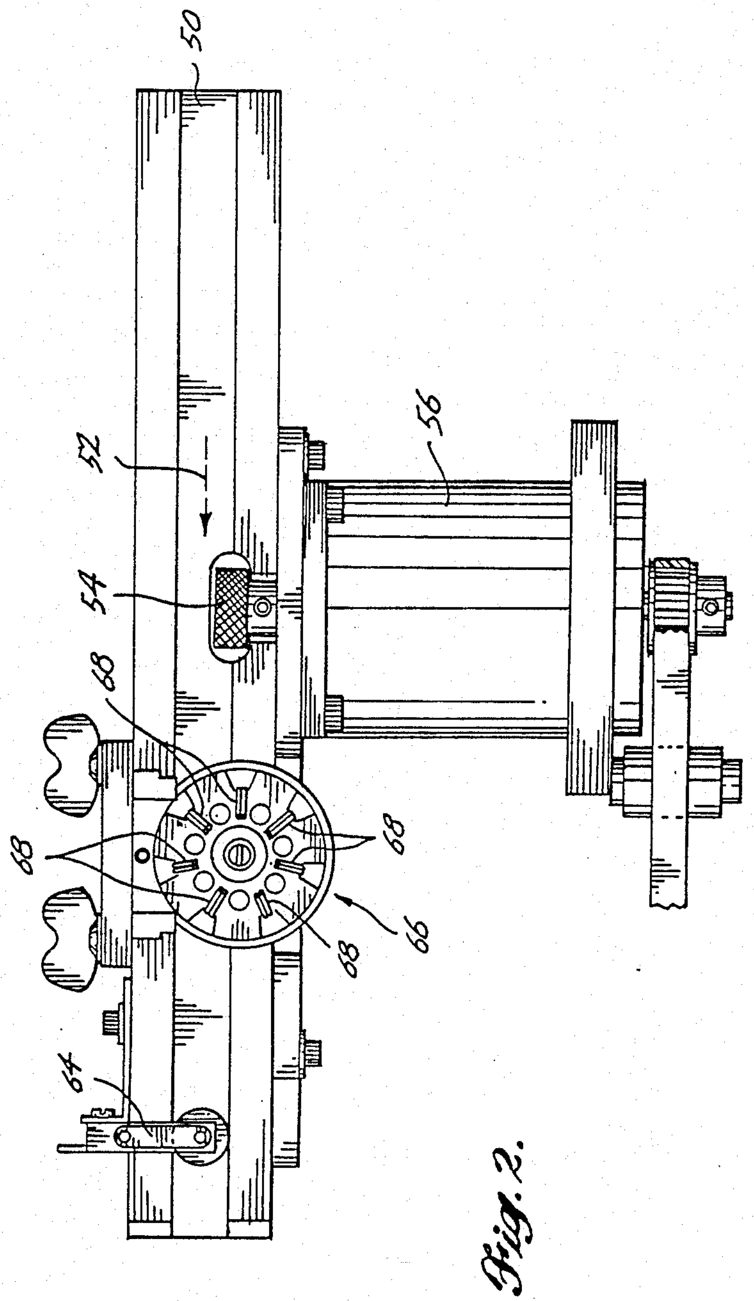
FIG. 2 is a plan view of a print head portion of a printer made in accordance with the principles of the present invention for simultaneously printing a bar code and a human-readable number adjacent one another on a splice tape.
Figure 3:
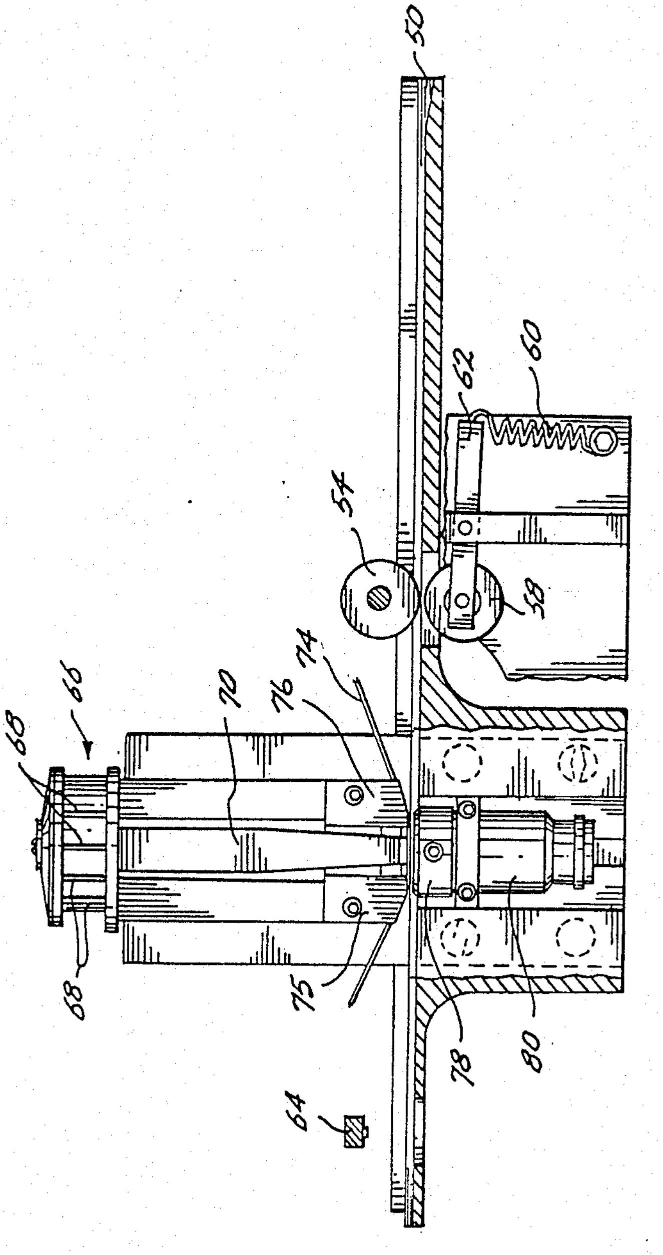
FIG. 3 is a side elevational view of the print head of FIG. 2.

In FIG. 1 the stages of a film-processing operation at a commercial photofinishing laboratory are represented. Incoming photographic orders are handled at an input station 10. In the input station orders from customers are received in envelopes E bearing the name and address of the customer and a designation of the dealer who initially received the order from the customer so that the order can be returned to the appropriate dealer and then to the appropriate customer. The order, typically, will consist of a roll R of undeveloped photographic film or film negatives F with instructions to produce photographic prints of certain of the negatives. At the input station the film (F or R) is separated from the envelope E and the film is then readied for processing, while the envelope is started on its path through the film lab to an eventual reunion with the film after processing. The film and the envelope both proceed to an identification station 12 where the film and the envelope are identified so that the envelope and film can be matched together after processing.

According to the principles of the present invention, the identification station 12 will contain a reader 14 that reads a bar code 15 already present on the envelope. The reader 14 will then transmit the identification number to a printer 16, which is mounted adjacent a splice tape carrier so that the number can be printed in machine-readable form, preferably a bar code, on a portion of the splice tape. The portion of the splice tape having the envelope number printed on it in bar code is separated from the rest of the splice tape and applied to adjacent ends of two adjacent filmstrips to form the filmstrips into a continuous web. Preferably, an arrow will also be printed on the splice tape. The arrow points toward the particular filmstrip that the identifying number on the splice tape relates to. The film then continues on through the processing steps and eventually is developed in the processing station 18 and passed to an order-finsihing station 20 where the developed film, prints printed from the film, and the envelope are all united prior to delivery to the customer. At the order-finishing station the bar-coded number from the splice tape and the bar-coded envelope number are again read and fed into a comparator to check the match between the two numbers. If the numbers match, then the order proceeds to be collated and returned to the customer. If there is a mismatch, an alarm signal is generated so that the operator can invervene and determine the cause of the mismatch. If desired, the prints made from the film are also marked with the same identifying number so that there is a three-way match possibility between the envelope, the film, and the prints. All three numbers must correlate before the order is allowed to complete processing and be returned to the customer.

The advantage to using the envelope number already existing on the envelope as an identification code is that, typically, the customers are given a receipt, which is usually a tear-off portion of the envelope, at the time that they bring the film in for processing. The envelope number is reproduced on the tear-off portion of the envelope so that the customer's receipt and the envelope can be matched. In schemes presently used where a new number is generated and used as an identification code, the identification code has no relation to anything that the customer has in his possession. In the scheme of the present invention the customer has the envelope number in his possession and that envelope number is used to maintain correlation of the order throughout the processing and, therefore, it is easy to trace the order, customer by customer, in the processing lab.

While it is useful to apply the identification code to the splice tape and have it present on the envelope in a machine-readable form, so that the number can be quickly read on an automatic basis, it is also desirable to have some human-readable indication on the film that allows the maintenance of sequence during processing to be easily checked by an operator through the various stages of the processing operation. For this reason, a human-readable identifying code is simultaneously printed on the splice tape at the same time that the bar code is printed. In one embodiment of the invention the human-readable number is the same as the bar code number, which is, in fact, the envelope number that has been read from the customer envelope. In another embodiment of the invention it is possible to use a different sequence number that relates to the sequence of this order in a given batch and apply that batch sequence number in human-readable form so that the sequence of the film in the batch can be maintained. This is all that is really necessary to track the film through the processing steps, since, at the end of processing, the bar-coded envelope number on the splice tape will be matched to the number on the envelope in order to maintain customer match.

Additionally, it is possible to include as part of the identification code additional characters, which are added in accordance with the customer instructions relating, for example, to number of prints. These extra characters can be added to the envelope number to produce the identification code. When the code is read at some later point in the processing operation, e.g., in the printer, not only is the code used to maintain correlation between film and envelope, but, also, the additional characters indicate to the printer the number of prints that are to be produced. At present, information, such as number of prints is obtained by manually checking the customer envelope from time to time to determine the customer's instructions or by keeping a separate log of customer instructions.

Figure 5:
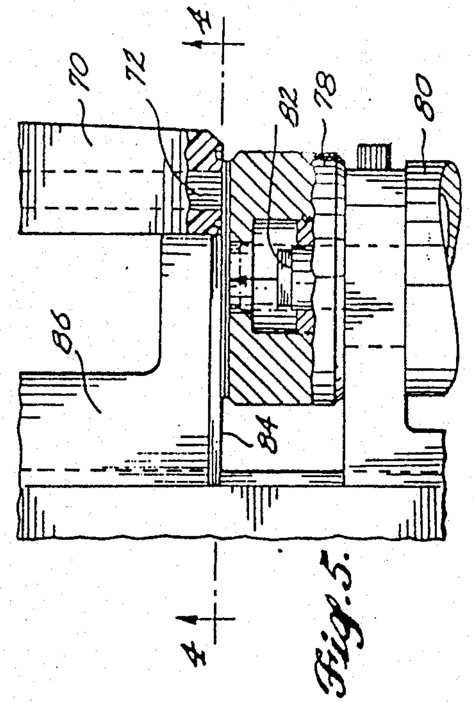
FIG. 5 is a side elevational view of the print head of FIG. 2.
Figure 6B:
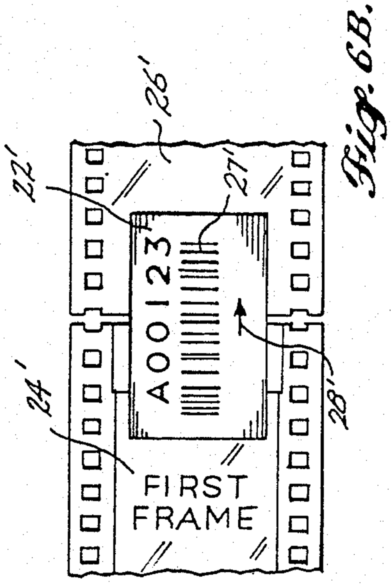
FIG. 6B is an illustration of a second embodiment of a splice tape marked in accordance with the principles of the present invention attached to two adjacent filmstrips.
Figure 6A:
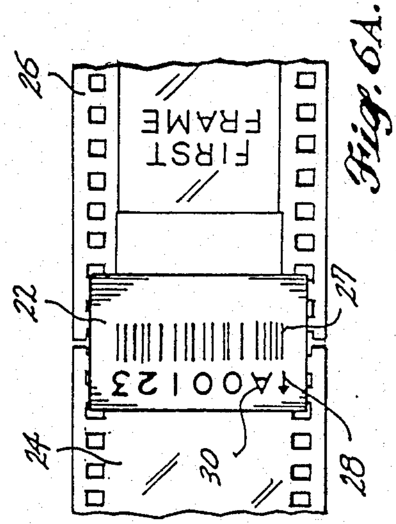
FIG. 6A is an ilustration of a splice tape marked in accordance with the principles of the present invention attached to two adjacent filmstrips.

As shown in FIG. 6A, the splice tape 22 is actually attached to two adjacent filmstrips 24 and 26. Since the splice tape contains only a single machine-readable indentification code 27, it is necessary for the operator to know which filmstrip that code is associated with. Therefore, the printer is also capable of printing an arrow on the splice tape, which points toward the particular filmstrip that the code relates to. In the splice tape of FIG. 6, a letter 30 is printed at the beginning of the human-readable code to indicate the particular machine on which the processing is being done. A number could be used in place of the letter 30. In the preferred embodiment illustrated, the identification code on the splice tape is not the entire envelope number. The envelope number in this example consists of 13 characters, while the identification code on the splice tape of FIG. 5 contains only five characters. In this case, the eighth to the twelfth characters of the envelope number are used. This supplies sufficient characters to maintain the sequence and matching of the orders in any given batch. In other cases, a six-digit envelope number might be translated into an identification code that uses only three of the six digits from the envelope number.

Figure 7:
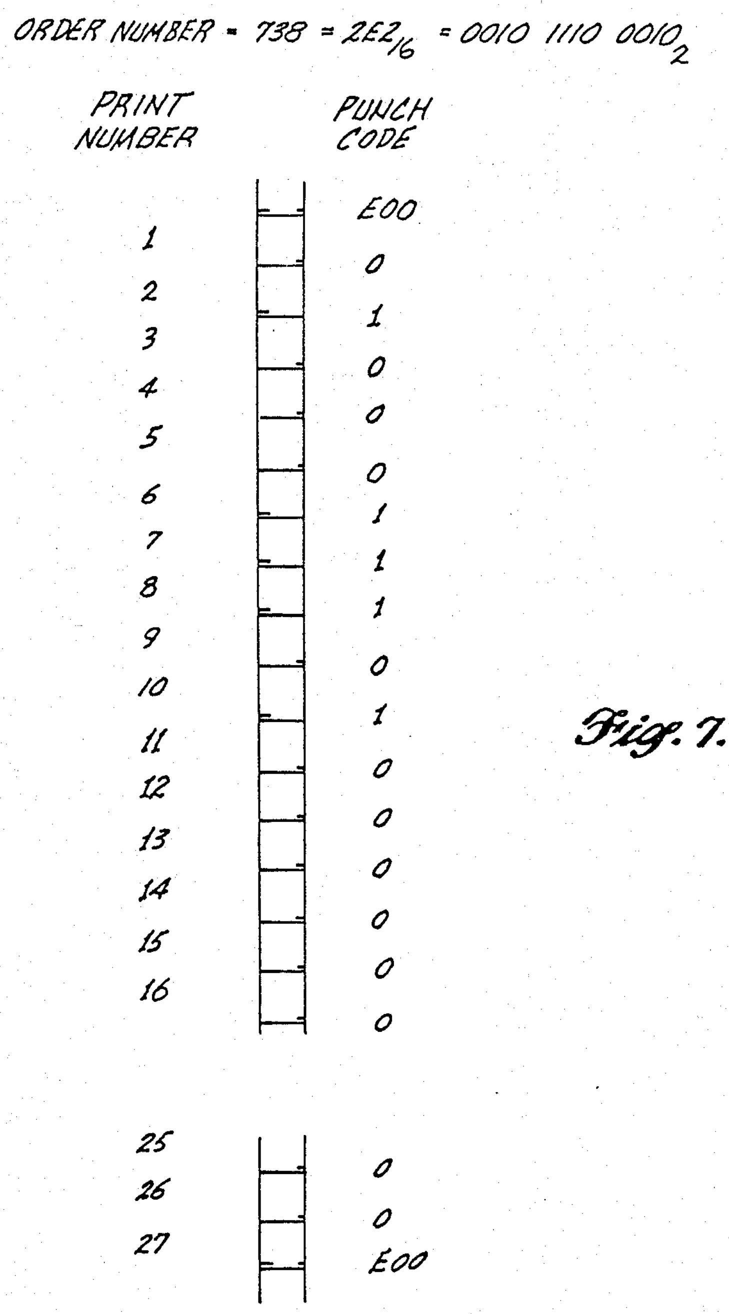
FIG. 7 is a somewhat schematic illustration of a strip of photograhic prints having an identification number encoded on the prints in accordance with the principles of the present invention.

For the purposes of three-way matching, as the concept is described in the U.S. Patent to Robert Wahli, U.S. Pat. No. 4,574,692, issued Mar. 11, 1986, it is necessary to also provide an identification number on the prints being made from the film. One way of performing that operation as described in Wahli is to print the identification number on the strip of prints associated with any given order. It has been found that it is difficult to print the bar code on the photographic prints in a reliable manner and the identification number printer that must be associated with the photographic printer, in order to print the identification number on the photographic prints, is relatively complex. However, in accordance with the present invention, a method for encoding the identification number, i.e., the envelope number, on the prints has been developed that employs a simple binary code with cut marks along one edge of the paper representing binary zero and cut marks along the other edge representing binary one. The conventional end-of-order marking will be represented by cut marks on both sides, as is currently the case in the photofinishing industry. FIG. 7 is an illustration of the encoding scheme of the present invention in use on a series of photograhic prints. According to the present invention, the order number in the example shown in FIG. 7, the number "738" is first converted to a binary number, in this case $2E2_{16}$, which equals 0010 1110 $0010_2$. The chip or blank space between the first and second prints of an order is punched with the least significant bit of the binary encoded number. The chip between the second and third prints is punched with the next to least significant bit, and so on. Note that this is a straight binary, not a binary-coded decimal technique. In FIG. 7 the uppermost print is the last print of the previous order and there is a cut mark indicated on either edge of that print that represents the end of the order (EOO). The next print is then the first print of the order that we are concerned with, and has a cut mark on the right edge, as viewed in FIG. 7, which, in this example, is used to indicate a binary zero. The next notch is made on the left edge, which indicates a binary one. This continues throughout the entire binary number, which ends at the twelfth print. In theory, any size of order number could be encoded in this manner. In practice, however, the number of digits accurately encoded is limited by the number of prints in the order. It takes 21 prints to encode a full six-digit order number; however, for purposes of matching, it is usually only necessary to encode the three least significant digits of the order number, since that represents a thousand orders, before the numbers begin to repeat, which would most likely mean that another batch, the chances of error are virtually eliminated. Using only the three least significant digits of the order number, orders with 11 or more prints can completely encode that three-digit order number in binary form. Ten prints are necessary for the binary code and then one is necessary for the end-of-order mark. All prints beyond the tenth one in normal orders would then be punched with a zero, except, of course, for the last print, which, as mentioned above, will be punched with the end-of-order mark.

Orders with less than 11 prints will be punched in exactly the same manner; however, one or more of the most significant bits of the order number will be missing. In cases with less than 11 prints, the print cutter will accumulate the binary digits as usual and report the resulting value to the order-finishing station controller, along with the total number of prints in the order. A central controller will form a mask based on the number of prints (N) in the order. The mask is simply a binary number in which the N-1 least significant bits are set to one. The mask can then be logically ANDed with the binary order number. If there is not a match between the result of the AND operation and the binary number reported by the print cutter, there has been an order mix-up. It is understood that with less than 11 prints it is possible for the central controller to conclude that a number from the print cutter is correct, when, in fact, it is not. There is, however, no case where the opposite conclusion is drawn. In other words, no good number from the print cutter will ever by judged bad by the central controller.

Figure 4:
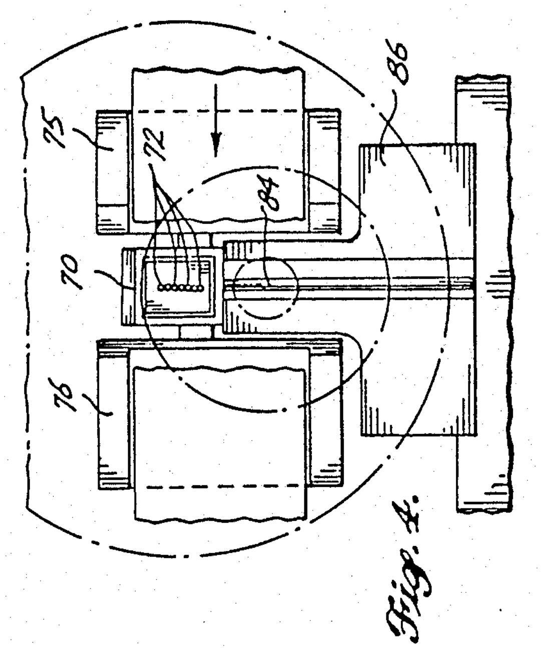
FIG. 4 is a view in partial section along line 4—4 of FIG. 5 of the print head of FIG. 2.

FIGS. 2, 3, 4, and 5 illustrate a print head that is capable of simultaneously printing a bar-coded and human-readable number on a splice tape. The print head includes a tape channel 50 and the splice tape is fed down the tape channel 50 in the direction of the arrow 52. The tape is fed by a roller 54 that overlies the tape and is driven by a stepper motor 56. A pressure roller 58 is oriented under the tape and is biased by a spring 60 through means of a lever arm 62 to maintain the grip on the tape. An optical sensor 64 is located along the path of the tape downstream of the print head. The optical sensor 64 senses the position of the splice tape and provides a signal to a tape motion controller that controls the stepper motor 56 to advance the tape as needed for printing and for separation of the printed segments into tape portions that are applied to the film splice as discussed above. A dot matrix print head 66 is mounted on the tape track 50 and is positioned above the tape path. The dot matrix print head 66 includes an arrangement of seven control coils 68 arranged in an annular pattern. A needle housing 70 extends downwardly from the control coil arrangement to a position just above the tape path. Referring to FIG. 4, an in-line arrangement of needles 72 is positioned within the needle housing 70 and reciprocates within the housing under the control of the control coils 68. A ribbon 74 passes through ribbon guides 75 and 76 mounted adjacent the needle housing 70 and passes between the ends of the needles 72 and the upper surface of the splice tape. Under control of a standard printer controller, selected ones of the needles 72 move downwardly and srike the upper perimeter surface of an annular shaped anvil 78 to print a dot on the splice tape corresponding to the needle. By selectively activating the needles, the human-readable characters on the splice tape are formed. Simultaneously with the action of the dot matrix printer, a control solenoid 80 positioned below the path of the tape is operated under the control of a second print controller to print the bar code adjacent the human-readable character. The solenoid 80 has a central slug 82 that is forced upwardly when the solenoid is energized and forces the tape and the ribbon 74 against a bottom edge 84 of a bar code anvil 86, which is affixed to the tape track. Each time the solenoid is activated a bar is printed on the splice tape. As can be best seen in FIG. 4, the needle arrangement and the anvil 86 are adjacent one another so that the human-readable and bar code identification codes are printed in adjacent spaces on the tape. The slug 82 passes through a central hole in the annular anvil 78 to contact the tape and force it into contact with the edge 84 of the bar code anvil 86. As the tape passes through the track under the dot matrix print head and the bar code anvil 86, successive bars and dots are printed until the entire identification code, in both bar code and human-readable form, is present on the tape. The tape is then advanced to the cutting station (not shown) where the segment containing identification numbers is separated from the remainder of the tape and applied to the film.

As shown in FIG. 6A, the tape is oriented such that the bar code is across the width of the film. One advantage to printing the bar code so that it is oriented across the splice, that is, so that the direction of reading of the bar code is across the width of the film rather than along its length, is that the code remains readable even if the splice is torn, since all of the bars will still be present and only shortened by the tear. Also, printing across the splice allows the use of a narrower tape so that the possibility of accidentally placing the splice tape over a usable part of the image on the film is lessened. The identification number can be read from the splice across the film length using a movable charge-coupled device (CCD) reader. In this way, the bar code can be read successive times and each successive reading compared to ensure proper reading of the code. Each read will be accomplished across a different portion of the bar code because of the motion of the film through the splicer, printer, finishing station cutter, or other apparatus between successive read operations.

FIG. 6B shows an alternate orientation of a splice tape 22'. The splice tape 22' is attached to filmstrips 24' and 26' with the identificatin code 27' oriented along the length of the film in the direction of film travel. Once again, an arrow 28' points toward the filmstrip 26', which is the strip associated with the code 27'. In this orientation it is possible to use a stationary bar code reader and use the film motion as the scanning movement of the bar code under the reader.

The invention therefore includes a system of marking the parts of a film-processing order so that a match can be maintained throughout the processing operation among the various pieces of the order. In this manner, the order can be properly reassembled after processing is completed and returned to the appropriate customer in the customer envelope. Apparatus is provided to assist in carrying out the method. The method includes reading an identification number already present on the envelope and printing that identification number in machine-readable form on a segment of a continuous stock of splicing tape. The marked splicing tape is then separated from the continuous stock and applied to the ends of adjacent filmstrips to join the filmstrips into a continuous reel for processing. Preferably, the identification number on the filmstrip includes an indicator that indicates to the operator the filmstrip with which the identification code on the splice is associated. Also, a human-readable identification code is marked on the splice tape at the same time that the machine-readable code is placed on the splice tape. The human-radable identifier may be the same identifier as the machine-readable identifier, i.e., the envelope number, or may be an arbitrarily assigned sequence number that has no direct relation to the envelope number. In order to provide a three-way match between the film, the envelope, and the photographic prints produced from the film, the photographic prints are also marked with a code representative of the envelope number. In the preferred embodiment the envelope code is marked in binary form by notches cut in opposite edges of successive ones of the prints associated with the particular order. A notch on one edge of the print indicates a zero and a notch on the other edge of the print indicates a one. As many of the least significant digits of the envelope as can be encoded on the continuous strip of prints are so encoded, limited by the number of prints in the order. Preferably, the envelope number is printed in machine-readable bar code on the splice tape and oriented in a direction so that when the splice tape is applied to the filmstrip the bar code is oriented across the filmstrip, rather than along the length of the filmstrip.

The apparatus to carry out the invention includes a printer for printing the machine-readable and human-readable code on the splice tape simultaneously. The printer includes a dot matrix printer array that strikes a print anvil that consists of a portion of an annular ring. The bar code printer acts through a central hole in the annular dot matrix anvil and includes a solenoid with a slug that reciprocates through the hole in the dot matrix anvil and strikes a bar code printer anvil, which includes an edge that forms the bar.

While a preferred form of the invention has been described and illustrated herein, it will be understood by those of ordinary skill in the art and others that changes can be made to the illustrated and described embodiment, while remaining within the scope of the present invention. For example, the human-readable and machine-readable numbers on the splice tape can both be the envelope number, or the human-readable number can be arbitrarily assigned sequence number. In addition, the machine-readable number can consist of only the envelope number or can include characters to indicate processing instructions, for example, number of prints. If the machine-readable number includes only the envelope number, the other markings can be made on the splice tape that indicate processing instructions. Since changes can be made in the implementation of the invention, the invention is to be' defined soley with reference to the claims that follow.

The embodiments of the invention in which an exclusive property or privilege is claimed are defined as follows:

1. A printer for printing a bar code and a human-readable number adjacent one another on a strip of tape including:

a tape track for receiving said tape, feed means associated with said tape track for moving said tape along said track in a first direction;

an array of dot matrix print needles mounted above said tape track for selective reciprocal movement of said needles toward said tape track;

a bar code anvil mounted adjacent said needle array, said anvil including a first edge portion;

a solenoid mounted below said tape track, said solenoid including a slug movable by energization of said solenoid to move upwardly to contact said edge portion of said bar code anvil;

a dot matrix anvil mounted below said tape track, at least a portion of said anvil being in register with said needle array;

ribbon guide means for guiding an inked ribbon between said needle array and said bar code anvil and a first surface of said tape;

first control means associated with said dot matrix needle array to selectively move said needles into contact with said ribbon to force said ribbon into contact with the first surface of said tape and consequently force a second surface of said tape into contact with said dot matrix anvil to print a dot image on said tape; and second control means associated with said solenoid to selectively energize said solenoid to move said slug into contact with a second surface of said tape and consequently force said first surface of said tape into contact with said ribbon and force said ribbon into contact with said edge portion of said bar code anvil to form a bar image on said tap.

2. The printer of claim 1, wherein said dot matrix anvil is annular and said slug moves within the central hole of said annulus.

3. The printer of claim 2, further including sensor means for sensing the end of said splice tape and developing a signal when said end is sensed.

4. In a photographic processing system for handling customer orders consisting of exposed photographic film, an envelope having an identification number on it in which the film is delivered to the processor, and photographic prints made from the film, a method of marking the parts of the order to maintain correlation between them, comprising the steps of:

reading the envelope number from the envelope;

printing the envelope number on a first portion of a continuous splice tape stock in machine-readable form and simultaneously printing a human-readable identification number on said first portion of said splice tape adjacent said machine-readable number;

separating the first portion from the stock applying said first portion to the film; and encoding at least a portion of the envelope number on the photographic prints in machine-readable form, said encoding step including representing said envelope number in binary form, cutting a notch on a first edge of said prints to represent a zero and cutting a notch on a second edge of said prints to represent a one, and cutting said notches between successive prints until at least the least significant digit of said envelope number is encoded on said prints.

5. A photographic order-handling system for processsing customer orders, including a film delivered to the processor in an envelope preprinted with an envelope number and prints made from the film, comprising:

envelope handler means for receiving said envelope;

envelope reader means associated with said envelope handler means for reading the preprinted envelope number and producing an envelope number signal representative of said envelope number;

splicer means for accepting said film and moving said film along a processing path in a first direction, said splicer means including splicer tape feed means for feeding a continuous stock of splice tape toward said processing path, and splicer tape cutter means for cutting a first portion of said continuous stock of splicer tape for application to adjacent ones of said films to join said films into a continuous web;

printer means associated with said splicer means for receiving said envelope number signal, said printer means including a bar code printhead for printing said envelope number in machine-readable form on said first portion of said splice tape prior to cutting of said first portion from said continuous stock and a dot matrix printhead adjacent said bar code printhead operable to simultaneously print a human-readable number adjacent said machine-readable envelope number; and a print handler for receiving said prints in a continuous strip, said print handler including encoder means for receiving said envelope number signal and encoding it into a digital binary signal, notcher means for receiving said digital binary signal and forming notches between adjacent images on said strip of prints representative of at least a portion of said digital binary signal.

6. The system of claim 5, wherein said notcher means forms a notch on a first edge of said strip of prints to represent a binary zero and forms a notch on a second opposing edge of said strip of prints to represent a binary one.

* * * * *

UNITED STATES PATENT AND TRADEMARK OFFICE
CERTIFICATE OF CORRECTION

PATENT NO. : 4,823,162

DATED : April 18, 1989

INVENTOR(S) : J.O. Renn et al.

It is certified that error appears in the above-identified patent and that said Letters Patent is hereby corrected as shown below:

| Column | Line | |
|---|---|---|
| 4 | 26 | "finsihing" should be --finishing-- |
| 4 | 35 | "invervene" should be --intervene-- |
| 6 | 35 | after "another" add --batch is involved. As long as the matching can be maintained in a given-- |
| 6 | 64 | "by" should be --be-- (1st occurrence) |
| 7 | 28 | "srike" should be --strike-- |
| 8 | 11 | "identificatin" should be --identification-- |
| 8 | 38 | "radable" should be --readable-- |
| 9 | 11 | insert --an-- after "be" |
| 9 | 16 | "the" should be --then-- |
| 9 | 19 | "soley" should be --solely-- |
| 9 | 58 | "tap" should be --tape-- |
| 10 | 13 | insert a semicolon (--;--) after "stock" |

Signed and Sealed this

Seventeenth Day of September, 1991

*Attest:*

HARRY F. MANBECK, JR.

*Attesting Officer*

*Commissioner of Patents and Trademarks*